Jan. 25, 1927.
J. L. ALLEN
1,615,432
VARIABLE SPEED TRANSMISSION
Filed Feb. 2, 1925
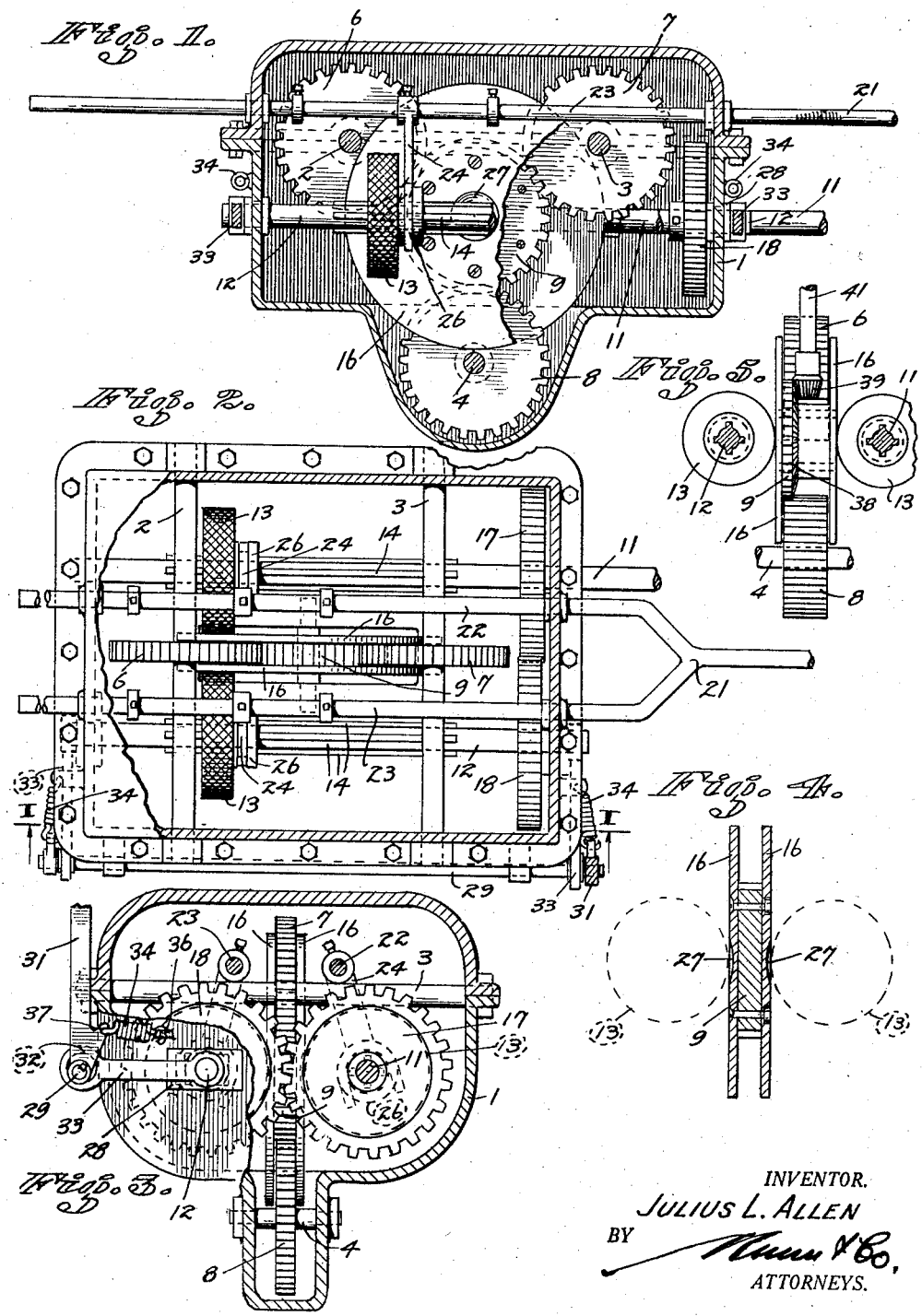
INVENTOR.
JULIUS L. ALLEN
BY
ATTORNEYS.

Patented Jan. 25, 1927.

1,615,432

UNITED STATES PATENT OFFICE.

JULIUS L. ALLEN, OF SACRAMENTO, CALIFORNIA.

VARIABLE-SPEED TRANSMISSION.

Application filed February 2, 1925. Serial No. 6,468.

The present invention relates to improvements in variable speed transmission, and has for its particular object to provide a simple means for transmitting power from one shaft to another in such a manner that the speed ratio may be changed at liberty without the necessity of any gear shifting and that the direction of motion may also be changed by the mere sliding motion of one or two friction wheels.

It is proposed in this connection to use for this purpose a gear wheel supported by three or more circumferentially arranged gear wheels so that no axial support for the first gear wheel is required and that friction wheels engaging the gear wheel on opposite sides for the purpose of transmitting motion may be slid diametrically across the face of the same without meeting with any obstacle such as a central shaft supporting the gear wheel.

It is further proposed to provide means whereby motion may be transmitted either from any one of the three supporting gear wheels or by the supported central gear wheel, either to shafts running transversely to the power shaft or to shafts running in alinement therewith.

Further objects and advantages of my device will appear as the specification proceeds.

The preferred form of my invention is illustrated in the accompanying drawing, in which Figure 1 represents a longitudinal section through my transmission taken substantially along line I—I of Figure 2.

Figure 2 is a top plan view of the same with a part of the cover removed to disclose the interior.

Figure 3 an end view of the device with part of the housing broken away.

Figure 4 a detail sectional view of the central gear wheel, and

Figure 5 a detail view illustrating means for transmitting motion directly from the central wheel to a shaft arranged in the plane thereof.

While I have shown only the preferred form of the invention, it should be understood that various changes or modifications may be made within the scope of the claims hereto attached without departing from the spirit of the invention.

A casing 1 of suitable form has three shafts 2, 3 and 4 transversely supported therein with gear wheels 6, 7 and 8 mounted on the three shafts in such a manner that they are adapted to support between the same a centrally arranged gear wheel 9 which latter has no axial support. The three gear wheels 6, 7 and 8 may be of the same size or may be of different sizes as long as they are arranged in supporting and driving relation to the central gear wheel 9.

Two longitudinal shafts 11 and 12 are supported in the walls of the casing so as to run alongside of the central gear wheel 9 and have friction wheels 13 slidable thereon and held against rotation relative to the shafts by splines 14 or by any other suitable means. The friction wheels 13 are arranged to normally frictionally engage the lateral faces of the disks 16 on the central gear wheel which latter disks are larger than the gear wheel and serve with their peripheral portions as guards for the three circumferentially arranged gear wheels, 6, 7 and 8. One of the two shafts 11 and 12 is the power shaft and may be considered connected to the crank shaft of the power plant of an automobile while the other shaft receives rotary motion from the first shaft through the two gears 17 and 18 in such a manner that the two shafts revolve in opposite directions.

The two friction wheels 13 may be slid back and forth along the outer faces of the disks 16 by means of a slidably mounted fork 21 which may be operated by the driver of the automobile by any suitable means, not shown in the drawing. The two prongs 22 and 23 of the fork have arms 24 extending therefrom which engage with grooved sleeves 26 fixed to the friction wheels 13 and slidable on the shafts 11 and 12 respectively.

It will be seen that when the two shafts 11 and 12 are rotated, the friction wheels 13 engaging the outer faces of the two disks 16 on opposite sides cause the latter and the gear wheel 9 to revolve, which rotary motion is transmitted to the three gear wheels 6, 7 and 8 from which power may be taken in any suitable manner. If it is desired to secure different transmission ratios at one time, the three gear wheels 6, 7 and 8 may be made of different diameters. The speed of the central gear wheel may be varied and reversed by sliding the friction wheels 13 on their supporting shafts by means of the fork 21, the gear wheel revolving relatively slow if the friction wheels engage the outer portion of the disks 16 and the speed ratio being increased as the friction wheels 13 are moved toward the center. To reverse the motion the friction wheels 13 are moved past the center so as to engage the friction wheel at diametrically opposite points. While passing the central point the friction wheels should remain inactive so as not to reversely affect the disks and for this purpose a central portion of the disks is dished out as shown at 27.

The shaft 11 is mounted in stationary bearings while the shaft 12 is mounted in sliding bearings 28 at opposite ends of the casing so as to allow its friction wheel 13 to be spaced from its respective disk when it is desired to prevent transmission of motion, the central gear wheel having sufficient play in its engagement with the three peripheral gear wheels to render the second friction wheel inactive when the first friction wheel is removed from engagement with the opposite disk. Any suitable means may be used for shifting the bearings 28 such, for instance, as a cam shaft 29 adapted to be operated by the driver by means of a handle 31 and provided with an eccentric 32 on which is supported one end of a link 33 the other end of which engages with the shaft 12 in the manner illustrated in Figure 3. When the handle 31 is pushed to the left as viewed in the latter figure, the eccentric 32 pulls the bearing 28 to the left through the link 33, whereby the friction wheel 13 is disengaged from the outer face of its disk. When the handle 31 is pushed to the right, the bearing 28 is moved in the opposite direction for engagement of the friction wheel with its disk. Normally the bearing 28, one of which is provided at either end of the casing, is pulled into an operative position by the spring 34 secured stationarily at one end, as shown at 36, and engaging with the other end a lug 37 fixed on the shaft 29.

The operation of the device thus far described will be readily understood from the foregoing description. The shaft 11 is the power shaft and transmits rotary motion in an opposite direction to the shaft 12 through the gear wheels 17 and 18. The friction wheels 13 are thereby revolved and engage with the outer faces of the two disks 16 so as to cause the latter to revolve and transmit rotary motion to the three gear wheels 6, 7 and 8 from which power may be taken for any purpose desired. To vary the speed the friction wheels 13 are moved along a diametrical line by means of the fork 21 from periphery to center and if it is desired to reverse the motion the friction wheels are pulled past center, the friction wheels remaining inactive while passing the center due to the cavities 27 in the two disks 16. To disengage the friction wheels from the disks, it is only necessary for the driver to push the handle 31 to the left, as viewed in Figure 3, whereby the shaft 12 is moved away from the disk and the whole gear wheel arrangement allows of sufficient play of the central gear wheel to render the other friction wheel also inactive. Normally the two friction wheels are forced into frictional engagement with the side faces of the two disks by the spring 34 pulling on the lug 37 and tending to force the two bearings 28 inwardly.

In Figure 5 is illustrated a simple means for transmitting motion directly from the central gear wheel 9 to a shaft running in the direction of the drive shaft. For this purpose many expedients may be used of which one consists in the arrangement of a bevel gear 38 in fixed relation to the central gear wheel 9 and in mounting a bevel pinion 39 on a shaft 41 for operative engagement with the said bevel gear. In this case it is necessary, of course, to space the two disks 16 somewhat further apart and the gear wheels 6, 7 and 8 should be made wider to approximately fill the space between the disks.

I claim:

1. In a transmission of the character described, three peripherally arranged gear wheels, a central gear wheel meshing with the same and supported thereby having no axial support, friction means engaging the faces of the latter wheel for rotating the same and through the latter the three peripheral wheels, bevel gear teeth associated with the central wheel and a shaft supported in the plane of the latter wheel having a bevel pinion thereon meshing with the bevelled teeth of the central wheel for transmitting motion to the shaft.

2. In a transmission of the character described, a central gear wheel, a plurality of peripheral gear wheels wholly supporting said central wheel, means for providing lateral play of the central wheel, two friction wheels disposed on opposite sides of said central wheel for transmitting power to same, means for moving one of said friction wheels laterally and out of contact with the central wheel whereby the central wheel is free to move out of contact with the other friction wheel, a shaft supported in the plane of the central wheel and a gearing connection between the shaft and the central wheel for transmitting power to said shaft.

JULIUS L. ALLEN.